United States Patent
Rosenberg

Patent Number: 5,884,064
Date of Patent: Mar. 16, 1999

[54] SYSTEM FOR EMULATING A VIRTUAL PATH IN AN ATM NETWORK

[75] Inventor: Jonathan David Rosenberg, Morganville, N.J.

[73] Assignee: Lucent Technologies Inc., Murray Hill, Del.

[21] Appl. No.: 707,690

[22] Filed: Sep. 4, 1996

[51] Int. Cl.⁶ .......................... G06F 9/455; G08C 15/00
[52] U.S. Cl. .................. 395/500; 395/527; 395/568; 370/395; 370/473; 370/474
[58] Field of Search .................. 395/500, 527, 395/561, 568; 370/395, 397, 399, 474, 465, 466, 470, 471, 473

[56] References Cited

U.S. PATENT DOCUMENTS

| | | | |
|---|---|---|---|
| 4,707,803 | 11/1987 | Anthony et al. | 395/500 |
| 4,709,328 | 11/1987 | Anthony et al. | 395/500 |
| 5,067,123 | 11/1991 | Hyoda et al. | 370/397 |
| 5,359,603 | 10/1994 | Metiffin | 370/399 |
| 5,457,687 | 10/1995 | Newman | 370/236 |
| 5,557,611 | 9/1996 | Cappellari et al. | 370/395 |
| 5,606,552 | 2/1997 | Baldwin et al. | 370/474 |
| 5,610,921 | 3/1997 | Christensen | 370/474 |
| 5,623,494 | 4/1997 | Rostoker et al. | 370/402 |
| 5,646,941 | 7/1997 | Nishimura et al. | 370/474 |
| 5,666,351 | 9/1997 | Oksanen et al. | 370/474 |
| 5,671,223 | 9/1997 | Shachar et al. | 370/474 |
| 5,673,262 | 9/1997 | Shimizu | 370/395 |
| 5,675,580 | 10/1997 | Lyon et al. | 370/474 |
| 5,712,853 | 1/1998 | Mathur et al. | 370/474 |
| 5,717,690 | 2/1998 | Peirce et al. | 370/474 |
| 5,734,653 | 3/1998 | Hiraiwa et al. | 370/474 |
| 5,734,659 | 3/1998 | Mann et al. | 370/474 |
| 5,737,312 | 4/1998 | Sasagawa | 370/474 |

Primary Examiner—Kevin J. Teska
Assistant Examiner—Russell W. Frejd
Attorney, Agent, or Firm—Frederick B. Luludis; Gregory J. Murgia

[57] ABSTRACT

A facility for mapping a plurality of different Virtual Circuit Channels (VCC) into a single VCC is provided for use in a data network. In operation, the facility assembles, in turn, data cells each having a data payload and appropriate header identifying a respective VCC into a series of data cells. The series is then segmented into a predetermined number of data payloads, and a header identifying a common connection over the network is then appended to each of the payloads. The result is then transported over the data network via the common connection.

14 Claims, 2 Drawing Sheets

SYSTEM FOR EMULATING A VIRTUAL PATH IN AN ATM NETWORK

TECHNICAL FIELD

The invention relates to Asynchronous Transfer Mode (ATM) networks and more particularly relates to emulating a virtual path in such a network.

BACKGROUND OF THE INVENTION

There are two types of connections in an ATM network—namely, virtual channel connections and virtual path connections associated with respective identifiers VCI and VPI. A virtual path connection (VPC) is an aggregation of the virtual channel connections (VCC). That is, a number of virtual channel connections may be associated with the same virtual path connection. A particular ATM connection between a source and destination is identified by both the VCI and VPI, as is well known. However, once data that is formed into an ATM cell and associated with a particular virtual path connection is admitted into an ATM network, then the network manages the data using only the VPI. The ATM network, therefore, does not consider the VCI in the routing and/or policing of the data.

As is also well-known, different services are provided for VCCs and VPCs as a result of their being treated differently by an ATM network, as mentioned above. Specifically, a VPC allows the user to independently set-up/terminate connections and allocate bandwidth between VCCs within the VPC without permission from the ATM network, thereby allowing the user to closely manage network resources allocated to the VPC. However, the user cannot manage the bandwidth allocated to a group of VCCs not associated with a VPC. Since a VPC provides the user with a higher level of service, the cost of a VPC is greater than the cost of a VCC.

SUMMARY OF THE INVENTION

I have recognized that despite the difference in services respectively associated with a VCC and VPC, a user may, nevertheless, use a less costly VCC as though it were a VPC. This is achieved, in accord with an aspect of the invention, by mapping a plurality of VCCs into a single VCC. In particular and in accordance with one embodiment of the claimed invention, data cells each comprising a data payload as well as a header identifying a respective connection within a network are formed into a series of data cells as they are received from different sources. The series is then processed to form a predetermined number of data payloads, and a header identifying a common connection over the network is then appended to each of the payloads. The result is then transported over the data network via the common connection.

These and other aspects of the claimed invention will be made more apparent in the following detailed description and accompanying drawing.

DETAILED DESCRIPTION

The claimed invention will be discussed in the context of an application that offers different type of information to an ATM network for transport to and from a particular destination. For example, an application in which a business communications system is offering voice and data to an ATM network. It is to be understood however that such an application should not be construed as a limitation of claimed the claimed invention since it will be made abundantly clear from the following discussion and accompanying drawings that the claimed may be used in a number of other applications.

Figure 1:
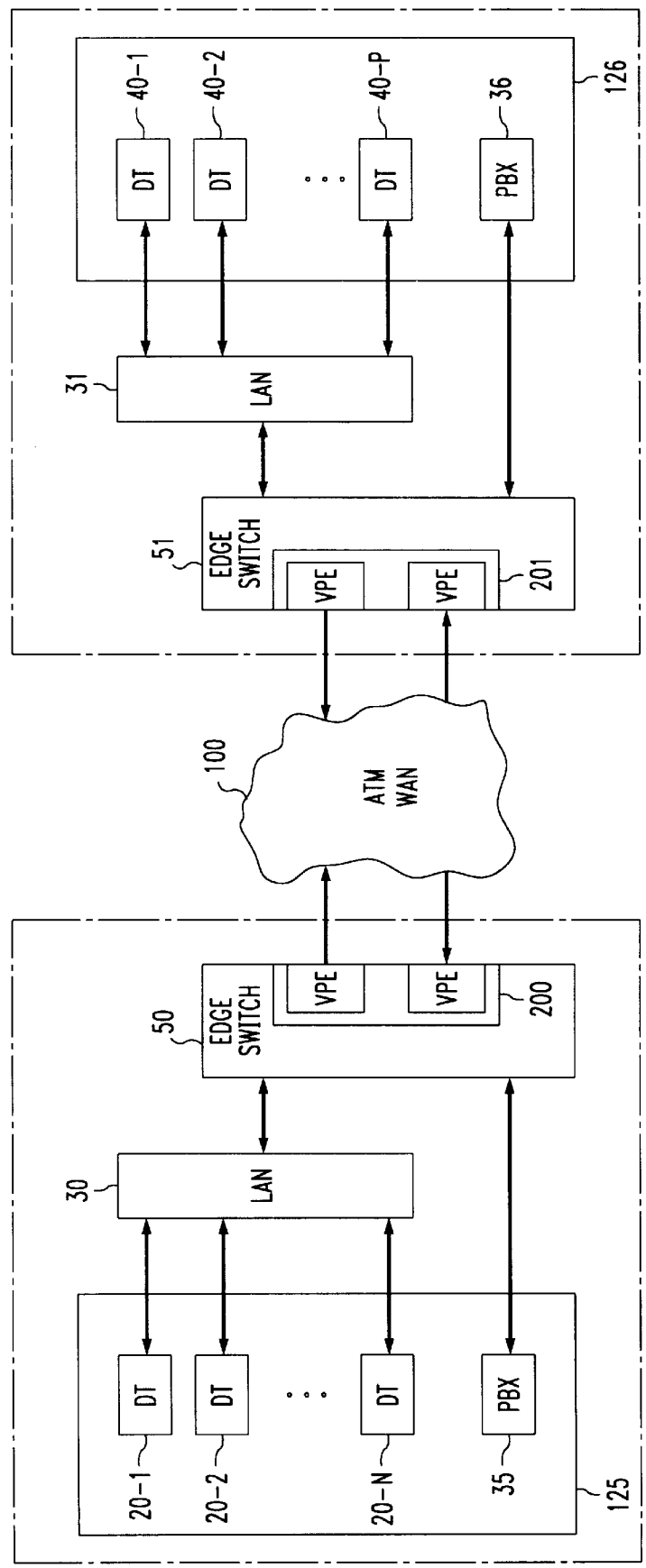
FIG. 1 is broad block diagram of data system in which the principles of the invention may be practiced.

In particular, FIG. 1 illustrates an illustrative communications system in which the principles of the invention may be readily practiced. Specifically, it is assumed that data terminals (DT) 20-1 through 20-M (where N>M) are communicating with respective ones of data terminals 40-1 through 40-j (where P>j) via conventional LAN 30, edge switch 50, ATM Wide Area Network (WAN) 100, edge switch 51, and LAN 31. Voice connections between PBX 35 and PBX 36 are also transported via edge switches 50 and 51 as well as ATM WAN 100, where edge switches 50 and 51 may be, for example, the BPX switch available from Newbridge Networks. It is assumed herein that customer premises equipments (CPE) 125 and 126 are operated by the same user and that ATM WAN 100 is operated by a network service provider. In such a case, the user of the CPE may lease a virtual path connection (VPC) from the network service provider as one way of establishing communications between CPE 125 and 126. In such an instance, the user may manage the allocation of the bandwidth provided by the VPC between the voice and data connections as needed. As a result, such a VP connection is more costly than a VC connection, as mentioned above.

As also mentioned above, I have recognized that such a VPC may be emulated by arranging the data cells respectively associated with a group of VCCs within another VCC. Specifically, the VCCs respectively established between, for example, DTs 20-1 through 20-M, and individual ones of DTs 40-1 through 40-N as well VCCs established between PBX 35 and PBX 36 for carrying respective voice circuits, may be transported over a single VCC, e.g., VCC 9, of ATM WAN 100. The function of mapping a plurality of VCCs into a single VCC 9 is implemented in a VP emulator respectively disposed at each end of the connection. In an illustrative embodiment of the invention, a VP emulator (200 and 201) is located in each of the edge switches 50 and 51 to present an interface between the respective edge switch and VCC 9. In operation, VP emulator, e.g., emulator 200, accumulates a group of cells (data and/or voice) that it receives from CPE 125 via LAN 30 and the associated edge switch 50. In a preferred embodiment of the invention, a group comprises eight cells. It is to be understood, however, that a group may comprise a different number of cells, e.g., 1 or 56. The eight cells, each of which comprises a 48 byte payload and five byte header for a total of 53 bytes, are then concatenated (strung together) in the order that are received to form a block of data comprising 424 bytes of data. A trailer comprising eight bytes is then appended to the 424 bytes and resulting block of 432 bytes is then segmented into nine ATM cell payloads each comprising 48 bytes. A conventional ATM header is then prepended to each cell payload, in which the VCI/VPI field in the ATM header is the VCI/VPI associated with VCC 9. The resulting ATM cells are then transported to VP emulator 201 via VCC 9 of ATM WAN 100. As mentioned above, VP emulator 201 interfaces edge switch 51 with VCC 9.

VP emulator 201, more particularly, accumulates nine cells supplied via VCC 9 and removes the 48 byte payload from each such cell. It then concatenates each such payload together in the order that they were received ATM WAN 100 to form a payload of 432 bytes. VP emulator 201 processes the 432 bytes in a conventional manner and then removes the aforementioned eight byte trailer to form a 424 byte block. VP emulator 201 then partitions the 424 byte block into the original eight 53 byte cells and presents the cells in turn to associated edge switch 51 for routing to LAN 31 and/or PBX 36, as the case may be. A similar process operates in the opposite direction to transmit ATM cells from CPE 126 to CPE 125.

Figure 2:
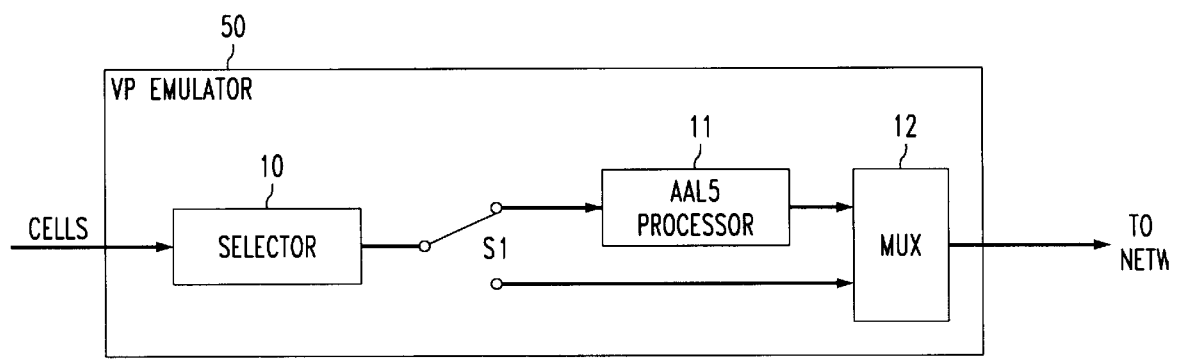
FIG. 2 is a broad block diagram of the VP emulator of FIG. 1.

A broad block diagram of a VP emulator 50 is shown in FIG. 2. As shown, an emulator includes a selector 10, switch S1, a conventional ATM Adaptation Layer 5 (AAL5) processor and a 2:1 multiplexer. An AAL5 processor may be, for example, the so-called ATM-IZER circuit available from Brooktree Corp. of San Diego, Calif. or the TNETA 1561 circuit available from Texas Instruments. Briefly, an AAL5 processor processes a data packet of any length by computing an eight byte trailer comprising a CRC code, payload length indicator, user-to-user information field, etc., and appending the trailer to the packet as well as any padding needed to make the total length of the resulting packet some multiple of 48 bytes. The AAL5 processor then segments the resulting packet into a number of payloads each comprising 48 bytes. The AAL5 processor then appends a conventional ATM header to each such payload to form an ATM cell and transmits the cell over the intended VCC connection.

More specifically, when a cell is received from the associated edge switch via path 8, selector 10 examines the cell to determine if the cell will be transported via the emulated VP (VCC 9, FIG. 1). If not, then selector 10 routes the cell via switch S1 to a second input of convention MUX 12. (Note that switch S1 is intended to represent electronic switching of data, such as via a decision block of a program that is processing the data.) In a illustrative embodiment of the invention, selector 10 checks the VPI of an incoming cell to see if the VPI is one that is to be emulated by VCC 9. Selector 10 may do this by storing in associated memory (not shown) a list of the of the VPIs that are to be transported (emulated) via VCC 9. If selector 10 finds that an incoming cell is to be transported via VCC 9, then selector 10 causes switch S1 to route the cell to AAL5 processor 11. AAL5 processor 11 accumulates eight cells in the order that it receives the cells via switch S1 and then processes the accumulated cells in the manner discussed above. AAL5 processor 11 then outputs the resulting nine cells to a first input of MUX 12 which routes those cells to the ATM network for transport via the emulated VPC, e.g., VCC 9.

Figure 3:
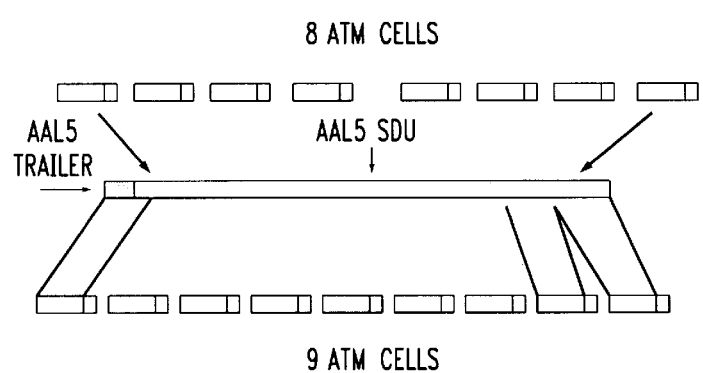
FIG. 3 is illustrates graphically the operation of the VP emulator.

The AAL5 process that is done in accord with the principles of the invention is depicted in schematic form in FIG. 3. Briefly, The AAL5 processor strings eight incoming cells together, adds the aforementioned trailer as shown and then segments the result into nine 48 byte payloads and then prepends a conventional ATM header to each such payload to form a cell.

The foregoing is merely illustrative of the principles of the invention. Those skilled in the art will be able to devise numerous arrangements, which, although not explicitly shown or described herein, nevertheless embody those principles that are within the spirit and scope of the invention. For example, it can be readily appreciated that the claimed invention may be disposed at a location other than an edge switch, for example, within an ATM network. As another example, it is clear that the claimed invention may be employed in applications that do not use an edge switch to interface a LAN with an ATM network. In fact, the claimed invention may be disposed in a LAN to provide that interface function. As another example, the ATM service provider may use the claimed invention at the edge of an associated ATM network so that all customers may send data over a plurality of VCCs and be able to allocate, in an arbitrary way, the bandwidth provided to those VCCs. As a further example, the claimed invention may be practiced in those cases where an AAL5 processor accumulates other than a string of eight cells, e.g., 56 cells or one cell.

As a further example, for a system other than ATM, a series of data packets received from different sources of data packets may be accumulated, and then formed into a payload of a packet common to each of the received data packets. A header identifying a connection over the data network is then appended to the payload and the result is transported over the associated data network via the identified connection. Moreover, a VPE may be easily arranged so that it operates in a duplex mode such that a single VPE may be used to interface an edge switch (transmit and receive) with an ATM network.

I claim:

1. A method of transporting data over a data network comprising the steps of responsive to receiving a series of data cells each comprising a data payload and a header identifying a respective connection over said network, forming a first predetermined number of the data cells in the order that they are received into a string of data cells, and processing the string of data cells to form a second predetermined number of data payloads, prepending a header identifying a common connection over said network to each of the payloads and transporting each result over the data network via said common connection.

2. The method of claim 1 wherein said data network is an ATM network.

3. The method of claim 1 wherein each said identification is different for each of said received series of data cells and wherein a respective connection includes a respective virtual channel identifier and virtual path identifier.

4. The method of claim 1 wherein said step of processing includes the step of appending an eight byte trailer to the string of data cells, said eight byte trailer including at least CRC code, payload length indicator and user to user information.

5. The method of claim 1 wherein said series of data cells are associated with a common virtual path connection in said network.

6. The method of claim 1 wherein said common connection is a virtual channel connection.

7. A method of transporting data over a data network comprising the steps of responsive to receiving a series of data cells each comprising a data payload and a header identifying a respective connection over said network, forming a first predetermined number of the data cells in the order that they are received into a string of data cells, and processing the string of data cells to form a second predetermined number of data payloads, prepending a header identifying a common connection over said network to each of the payloads and transporting each result over the data network via said common connection, wherein said first predetermined number is eight and said second predetermined number is nine.

8. A method of transporting data over a data network comprising the steps of responsive to receiving a series of data cells each comprising a data payload and a header identifying a respective connection over said network, forming a first predetermined number of the data cells in the order that they are received into a string of data cells, and processing, using an ATM Adaptation Layer No. 5 protocol, the string of data cells to form a second predetermined number of data payloads, prepending a header identifying a common connection over said network to each of the payloads and transporting each result over the data network via said common connection.

9. A method of transporting data over a data network the steps of accumulating a series of data packets received from different sources of data packets, and forming the received data packets into a payload of a packet common to each of the received data packets, appending a header identifying a connection over said data network to the common packet payload and transporting the result over said data network via said connection.

10. The method of claim 9 wherein said step of forming includes the step of appending an eight byte trailer to the series of data packets, said eight byte trailer including at least CRC code, payload length indicator and user to user information.

11. The method of claim 9 wherein said series of data packets are associated with a common virtual path connection in said network.

12. The method of claim 9 wherein said connection is a virtual channel connection.

13. A method of transporting data over a data network comprising the steps of accumulating a series of data packets received from different sources of data packets, and forming, using an ATM Adaptation Layer No. 5 protocol, the received data packets into a payload of a packet common to each of the received data packets, appending a header identifying a connection over said data network to the common packet payload and transporting the result over said data network via said connection.

14. A method of processing data for transmission over a data network receiving data cells for transmission over the data network and forming the data cells into a string of eight cells in the order that they are received, appending a trailer to the string of eight cells and then segmenting the result into nine data payloads, and prepending a data header to each of the data payloads in which such header includes information identifying the same virtual channel connection and transmitting each resulting data cell over said network via the identified virtual channel connection.

* * * * *